(12) United States Patent
Widmer

(10) Patent No.: US 10,202,199 B2
(45) Date of Patent: Feb. 12, 2019

(54) METHOD AND DEVICE FOR MONITORING A DEVIATION OF A FIRST ROTATIONAL SPEED OF A FIRST DRIVE UNIT FOR AN AIRCRAFT FROM A SECOND ROTATIONAL SPEED OF AN AT LEAST SECOND DRIVE UNIT FOR AN AIRCRAFT

(71) Applicant: Robert Bosch GmbH, Stuttgart (DE)

(72) Inventor: Martin Widmer, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/807,299

(22) Filed: Nov. 8, 2017

(65) Prior Publication Data

US 2018/0134405 A1    May 17, 2018

(30) Foreign Application Priority Data

Nov. 17, 2016    (DE) .................. 10 2016 222 652

(51) Int. Cl.
*B64D 31/12* (2006.01)
*F02D 25/02* (2006.01)
*B64C 11/50* (2006.01)

(52) U.S. Cl.
CPC .............. *B64D 31/12* (2013.01); *B64C 11/50* (2013.01); *F02D 25/02* (2013.01)

(58) Field of Classification Search
CPC .......... B64D 31/12; B64C 11/50; F02D 25/02
USPC ............................................. 701/99
See application file for complete search history.

(56) References Cited

U.S. PATENT DOCUMENTS 2,859,005 A * 11/1958 Owen .................. G05D 1/0066
                                                    244/185
4,215,412 A *  7/1980 Bernier ..................... G07C 3/00
                                                    701/100
2007/0250247 A1* 10/2007 Yasui .................. F02D 41/1401
                                                    701/103

* cited by examiner

*Primary Examiner* — Gertrude Arthur Jeanglaude
(74) *Attorney, Agent, or Firm* — Norton Rose Fulbright US LLP; Gerard Messina

(57) ABSTRACT

A method and a device for monitoring a deviation of a first rotational speed of a first drive unit for an aircraft from a second rotational speed of an at least second drive unit of an aircraft. The monitoring of the deviation of the first rotational speed of the first drive unit from the second rotational speed of the at least second drive unit is carried out as a function of a comparison of a detection of a first event of the first drive unit to a detection of a second event of the at least second drive unit.

14 Claims, 2 Drawing Sheets

METHOD AND DEVICE FOR MONITORING A DEVIATION OF A FIRST ROTATIONAL SPEED OF A FIRST DRIVE UNIT FOR AN AIRCRAFT FROM A SECOND ROTATIONAL SPEED OF AN AT LEAST SECOND DRIVE UNIT FOR AN AIRCRAFT

CROSS REFERENCE

The present application claims the benefit under 35 U.S.C. § 119 of German Patent Application No. DE 102016222652.5 filed on Nov. 17, 2016, which is expressly incorporated by reference in its entirety.

FIELD

The present invention relates to a method and a device for monitoring a deviation of a first rotational speed of a first drive unit for an aircraft from a second rotational speed of an at least second drive unit for an aircraft.

BACKGROUND INFORMATION

Internal combustion engines with carburetors are still in use to a large extent in general aviation (Part 25). The propellers of the aircraft are coupled to the engines directly or with the aid of a nonadjustable gear. In this aircraft class, propellers are predominantly used for the drive, and each has a (hydraulic) propeller speed controller that is controlled via a pull cable and/or via a separate propeller control unit.

Very small deviations among the rotational speeds of the aircraft propellers result in acoustical and vibrational disturbances of the aircraft.

A conventional rotational speed controller is not appropriate, since during the flight operation, uniform running of the engine/propeller is not to be expected on account of external interferences (turbulences). Thus far, for eliminating the rotational speed deviation in multiple engines, the propellers have been synchronized with the aid of a separate controller, and also with the aid of special propeller speed controllers.

The synchronization of the rotational speed of the engines is necessary primarily due to acoustic beats that arise at different engine speeds.

SUMMARY

The present invention relates to a method and a device for monitoring a deviation of a first rotational speed of a first drive unit for an aircraft from a second rotational speed of an at least second drive unit of an aircraft, and a computer program on a memory medium for carrying out the method.

In a first aspect of the present invention, monitoring of a deviation of a first rotational speed of a first drive unit for an aircraft from a second rotational speed of an at least second drive unit of an aircraft is carried out, the monitoring of the deviation of the first rotational speed of the first drive unit from the second rotational speed of the at least second drive unit being carried out as a function of a comparison of a detection of a first event of the first drive unit to a detection of a second event of the at least second drive unit.

This has the particular advantage that, by detecting the first event of the first drive unit and detecting the second event of the second drive unit of the aircraft, a simple and resource-saving method for monitoring deviations of the first rotational speed of the first drive unit from the second rotational speed of the at least second drive unit may be carried out as a function of the comparison of the detection of the first and the second events. In addition, the method is particularly well suited for monitoring very small deviations between the first rotational speed of the first drive unit and the second rotational speed of the at least second drive unit, based on the detected events. In one preferred embodiment, the described aircraft is a dual-engine aircraft, i.e., an aircraft with two drive units. In one alternative specific embodiment, the aircraft may also include multiple engines on each wing. For this case, the additional engines on each wing may, for example, be recombined into one drive unit. This means that the engines on each wing are combined into one drive unit.

Another advantage results when a value of the counter is incremented when the first event of the first drive unit is detected, and is decremented when the second event of the at least second drive unit is detected. This has the particular advantage that the computations may be implemented/programmed particularly easily in a control unit, and therefore cost-efficient processing units, such as electronic engine control units (EECUs) or autonomous, full authority digital engine controllers (FADECs), may be used, since it is not necessary to carry out computation-intensive computations.

In one preferred embodiment, there is a central counter in the control unit of the second drive unit. This has the advantage that the resources or computing power in the first control unit may be saved. In one alternative embodiment, the counter may also be provided in the control unit of the first drive unit. Alternatively or additionally, the counter may be simultaneously provided in the control unit of the first drive unit and in the control unit of the second drive unit.

It is also advantageous when the value of the counter is incremented and decremented in whole numbers, since a simple computation of the counter may be programmed on the control unit or on the control units, and resources may thus be saved and cost-efficient processing units may be used.

It is particularly advantageous when the first event is a firing of a cylinder of an engine of the first drive unit, and the second event is a firing of a cylinder of an engine of the at least second drive unit.

This has the particular advantage that the events of the firing of the cylinder of an engine of the first drive unit may thus be more easily compared to the firing of a cylinder of an engine of the at least second drive unit. In one advantageous specific embodiment, in each case the same cylinders are specified for the first engine and the second engine. The same or similar cylinder of the engine of the first drive unit and of the second drive unit is understood in particular to mean the particular first cylinder of the engines of, for example, a total of four cylinders per engine.

Another advantage results when the first event is a signal of a position sensor of the first drive unit, and the second event is a signal of a position sensor of the at least second drive unit. This has the particular advantage that the signal of the position sensor of the first drive unit and the signal of the position sensor of the at least second drive unit may be easily compared to one another.

It is particularly advantageous when the adaptation of the deviation of the first rotational speed of the first drive unit from the second rotational speed of the at least second drive unit of the aircraft is carried out as a function of a comparison of the value of the counter to a predefinable threshold value. This has the particular advantage that this adaptation of the deviation may be easily implemented in a control unit, and thus carried out in a resource-saving manner. In addition, by use of the method, very small deviations of the first rotational speed of the first drive unit from the second rotational speed of the at least second drive unit may be detected, and adapted as a function of a comparison of the value of the counter to the predefinable threshold value. In one preferred embodiment, the adaptation of the deviations of the first rotational speed of the first drive unit and the second rotational speed of the at least second drive unit is carried out by the propeller speed controllers of the first and the second drive units.

It is also advantageous that the deviation of the first rotational speed of the first drive unit from the second rotational speed of the at least second drive unit is adapted when the value of the counter is above or below a predefinable threshold value. This has the particular advantage that a deviation of the first rotational speed of the first drive unit from the second rotational speed of the at least second drive unit may be determined in this way. In addition, it is advantageous that it may be recognized, as a function of the value of the counter that is above or below the predefinable threshold value, whether the first rotational speed of the first drive unit is higher or lower than the second rotational speed of the at least second drive unit.

In one alternative specific embodiment, it may also be recognized whether the rotational speed of the at least second drive unit is higher or lower than the first rotational speed of the first drive unit.

In one preferred embodiment, the control unit of the first drive unit recognizes and stores an error when the value of the counter is above or below a predefinable threshold value, and a corresponding signal is transmitted from the control unit of the first drive unit to the control unit of the at least second drive unit via a CAN connection, for example, and the signal is received and stored by the second control unit of the at least second drive unit. In one alternative specific embodiment, the link between the control unit of the first drive unit and the control unit of the at least second drive unit may also be established via radio or via an alternative communication link. This has the particular advantage that increased redundancy may be achieved due to the transmission of the recognized error between the control units, as the result of which the safety of the aircraft may be increased in the event of a failure of one of the control units.

It is particularly advantageous when a phase position between the first drive unit and the at least second drive unit, in particular a propeller of the first drive unit and a propeller of the at least second drive unit, is determined as a function of a time difference that is ascertained between the first event of the first drive unit and the successive, similar second event of the at least second drive unit. This has the particular advantage that, due to the time difference that is ascertained between the occurrence of the first event of the first drive unit and the successive, similar occurrence of the second event, a phase position between the first drive unit and the at least second drive unit, i.e., between the propeller of the first drive unit and the propeller of the at least second drive unit, may be determined. A similar event of the first drive unit and of the at least second drive unit is understood to mean, for example, an ignition operation of a cylinder that is equivalent for both engines, such as, for example, the first of four cylinders. In the alternative specific embodiment, the event of the first drive unit and of the at least second drive unit in each case corresponds to a signal of the particular position sensor of the first drive unit and the second drive unit. This has the particular advantage that the phase position may be easily determined, and the method for this purpose may be implemented in a control unit in a resource-saving manner.

In addition, it is advantageous when the position sensor of the propeller of the first drive unit and the position sensor of the propeller of the at least second drive unit detect a position value of the particular rotating propeller that is above or below a predefinable reference position, and transmit a corresponding signal from the particular position sensor to the particular control unit as a function of the exceedance by the particular propeller with the aid of the CAN connection, and the signal is received and stored by the particular control unit.

In one preferred embodiment, it is advantageous when the first drive unit and the at least second drive unit are each made up of an engine and/or an associated electronic control unit, in particular an electronic engine control unit (EECU) or an autonomous, full authority digital engine controller (FADEC), and/or a propeller that is connected to the engine and/or a propeller speed controller that controls the rotational speed of the propeller and/or a position sensor of the propeller. This described design is cost-efficient, since a mechanical pull cable for controlling the propeller speed sensor may be dispensed with due to the control of the propeller speed controllers via the electronic control units. In addition, due to the use of the electronic control unit which does not control just the propeller speed sensor, a separate propeller speed sensor control unit may be dispensed with, which results in reduced weight of the aircraft.

Another advantage is that the control unit of the first drive unit is a master control unit and the control unit of the at least second drive unit is a slave control unit, since increased redundancy, and thus greater safety in the event of a failure of one of the control units, is thus present.

In further aspects, the present invention relates to a device, in particular a control unit, and a computer program that is configured, in particular programmed, for carrying out one of the methods. In yet another aspect, the present invention relates to a machine-readable memory medium on which the computer program is stored.

BRIEF DESCRIPTION OF THE DRAWINGS

The present invention is described in greater detail below with reference to the figures, and based on exemplary embodiments.

DETAILED DESCRIPTION OF EXAMPLE EMBODIMENTS

Figure 1:
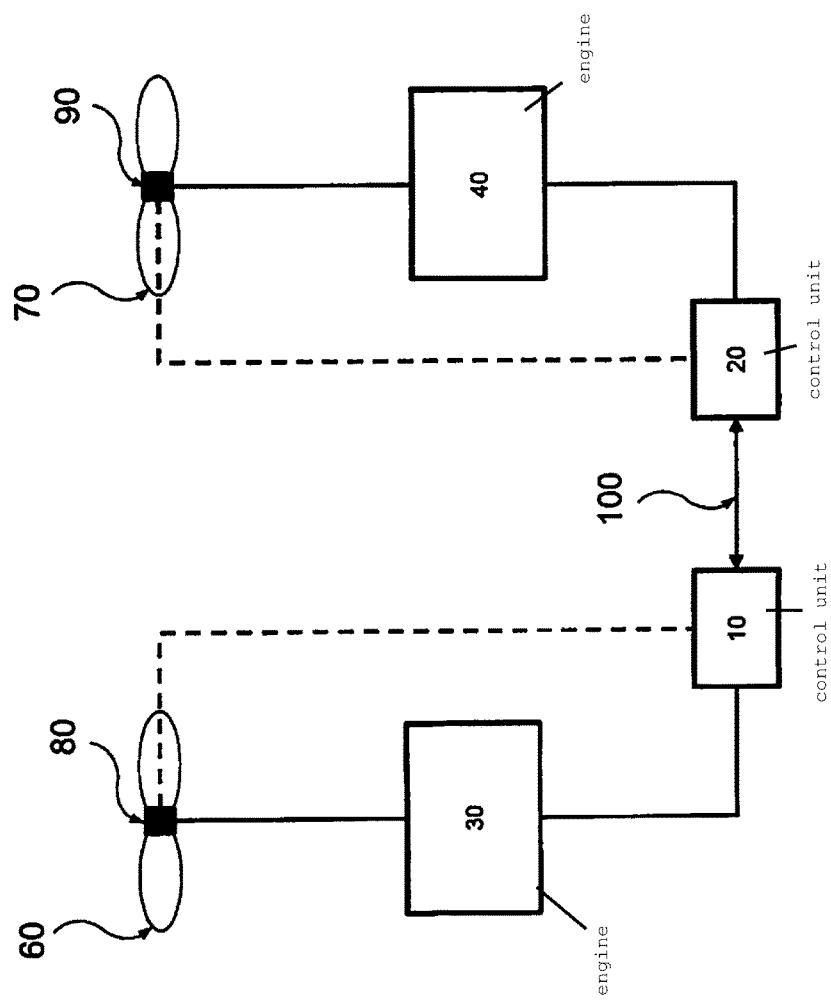
FIG. 1 shows a schematic illustration of a first and a second drive unit of an aircraft.

FIG. 1 shows a schematic illustration of a first drive unit and a second drive unit of an aircraft. The first drive unit of the aircraft is made up of a control unit 10, for example an electronic engine control unit (EECU) or an autonomous, full authority digital engine controller (FADEC), control unit 10 controlling an engine 30. For this purpose, control unit 10 is connected to engine 30, for example with the aid of a communication link, in particular a Controller Area Network (CAN) connection, and may control events or parameters such as the firing of the particular cylinders of engine 30, the rotational speed of engine 30, and injection times of fuel into the cylinders, etc., of engine 30, and may transmit and receive same as signals or data via the CAN connection. In addition, control unit 10 is connected to a propeller speed sensor 80, for example a propeller speed sensor 80 having a hydraulic and/or an electronic design. For this purpose, control unit 10 is connected to propeller speed sensor 80 with the aid of, for example, a communication link, in particular a CAN connection, and may thus control the rotational speed of propeller 60, which is connected to engine 30.

The second drive unit is made up of the same components as the first drive unit. Control unit 20 is made up, for example, of an electronic engine control unit (EECU) or an autonomous, full authority digital engine controller (FADEC), control unit 20 controlling an engine 40. In addition, control unit 20 is also connected to engine 40 with the aid of a communication link, in particular a CAN connection, and may control events or parameters such as the firing of the particular cylinders of engine 40, the rotational speed of engine 40, and injection times of fuel into the cylinders, etc., of engine 40, and may transmit and receive same as signals or data via the CAN connection.

Control unit 20 is connected to propeller speed sensor 90 with the aid of a communication link, in particular a CAN connection, and may thus control the rotational speed of propeller 70, which is connected to engine 40.

Propeller speed sensors 80; 90 also each include a position sensor. The position sensors are capable of detecting, during operation, when propellers 60; 70 exceed a predefinable reference position during rotation of the propellers, i.e., for an active drive, and transmitting the detection in the form of a signal to the particular control unit 10; 20 via a CAN connection. In one preferred specific embodiment, for this purpose the reference position is selected to be the same for both propellers, so that, for example, a phase position between the two rotating propellers 60; 70 may be ascertained.

In addition, control units 10 and 20 may exchange data such as rotational speed, fuel injections of engines 30; 40, or events such as firings of the cylinders of the particular engine 30; 40, and/or the detection of the position sensors via CAN connection 100, with one another via a communication link, in particular a CAN connection 100. In one preferred specific embodiment, for each detected event, for example, that in each case the first cylinder of the first and second engines 30; 40 has fired, control units 10; 20 transmit with the aid of data via CAN connection 100. The data may be transmitted by CAN messages, with the aid of CAN connection 100, from the first control unit to second control unit 20, and conversely.

In one advantageous embodiment, a master control unit and a slave control unit may be defined between control units 10; 20. Specifying a master control unit and a slave control unit may take place, for example, by encoding in the cable harness. All other drive units with the associated control units then operate in slave mode, i.e., are slave control units.

Figure 2:
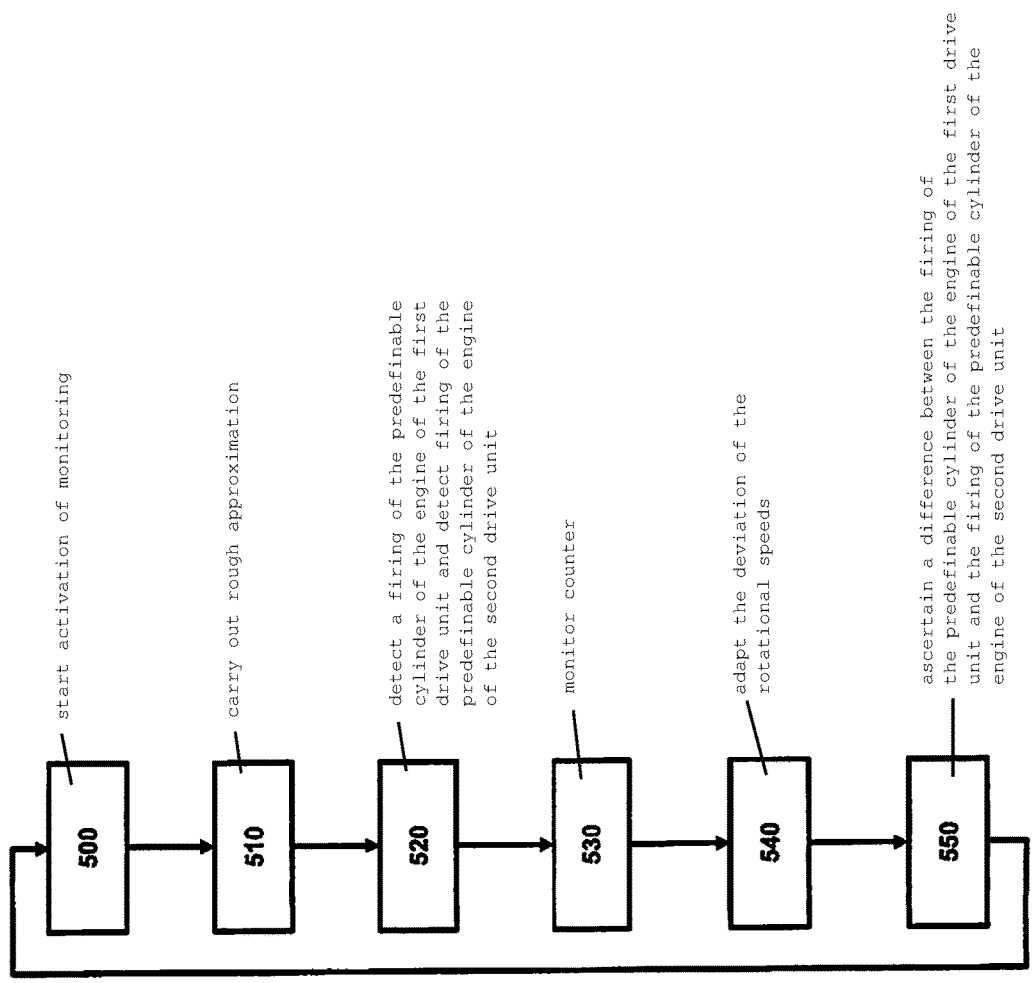
FIG. 2 shows a function diagram for explaining the method for monitoring a deviation of a first rotational speed of a first drive unit for an aircraft from a second rotational speed of an at least second drive unit of an aircraft.

FIG. 2 shows a function diagram for explaining the method for monitoring a deviation of a first rotational speed of a first drive unit for an aircraft from a second rotational speed of an at least second drive unit of an aircraft.

In one preferred specific embodiment, an activation of the monitoring of the deviation of the first rotational speed of the first drive unit from a second rotational speed of an at least second drive unit by master control unit 10 is started in a step 500. For this purpose, master control unit 10 transmits, with the aid of CAN connection 100, information to slave control unit 20 that the monitoring of the deviation of the first rotational speed of the first drive unit from the second rotational speed of the second drive unit has started.

In one preferred specific embodiment, initially a rough approximation of the first rotational speed of the first drive unit to the second rotational speed of the second drive unit is carried out by master control unit and/or slave control unit 10; 20 in a step 510. For this purpose, a setpoint rotational speed is predefined by master control unit or slave control unit 10; 20 for the first and second drive units, and with the aid of CAN connection 100 the setpoint rotational speed is exchanged and converted between master control unit and slave control unit 10; 20 by use of data. When this rough rotational speed approximation has concluded, in a step 520 when master control unit 10 detects a firing of the predefinable cylinder of engine 30 of the first drive unit, a value of a counter is incremented, and when slave control unit 20 detects a firing of the predefinable cylinder of engine 40 of the second drive unit, the value of a counter is decremented. In each case the same cylinder is specified for detecting the firing for first and second engines 30; 40. Alternatively or additionally, instead of detecting the firing of the predefinable cylinder, a signal of a position sensor of the first drive unit and of the second drive unit may be utilized for incrementing and decrementing the counter value.

This means that master control unit 10 increments the value of the counter when the position sensor of the first drive unit detects that propeller 60 exceeds a predefinable reference position during the rotation. Slave control unit 20 correspondingly decrements the value of the counter when the position sensor of the second drive unit detects that propeller 70 exceeds the predefinable reference position during the rotation. The reference position is selected to be the same for the position sensor of the first drive unit and the position sensor of the second drive unit.

In one preferred embodiment, the value of the counter is ascertained centrally in one of the two control units 10 or 20. This means that the detection or the incrementing of the counter value by master control unit 10 takes place by the transmission of a signal from master control unit 10 to slave control unit 20 via CAN connection 100, or conversely. Alternatively or additionally, master control unit 10 may decrement the value of the counter, and slave control unit 20 may increment the value of the counter.

In one alternative specific embodiment, in each case a counter value may also be ascertained in master control unit and slave control unit 10; 20. The counter values are subsequently compared to one another, for example by forming a difference of the two values of the counters.

The value of the counter is then continuously monitored, for example via slave control unit 20, in a step 530. If the value of the counter is above or below a predefinable threshold value, a deviation of the rotational speed of the first drive unit from the rotational speed of the second drive unit is recognized. In one alternative specific embodiment, the value of the counter may also be monitored over a predefinable time interval. If the value of the counter monitored over the time interval is above or below a predefinable threshold value, a rotational speed deviation between the rotational speed of the first drive unit and the rotational speed of the second drive unit is recognized. In one alternative specific embodiment, a predefinable lower threshold value and a predefinable upper threshold value may also be utilized for the monitoring.

When a deviation of the rotational speed of the first drive unit from the rotational speed of the second drive unit is recognized from the value of the counter that is above or below the predefinable threshold value, a function for adapting the deviation of the rotational speeds is started in a step 540. As a function of the value of the counter that is above or below the predefinable threshold value, the deviation of the rotational speed between the first and the second drive units is adapted by controlling the engine speed of engine 30 of the first drive unit and/or the engine speed of engine 40 of the second drive unit, and/or via propeller speed sensors 80; 90 of the first and second drive units by master control unit 10 and/or slave control unit 20.

In one preferred specific embodiment, a signal from first or second control unit 10; 20, for example, is received and/or transmitted and/or stored in the memory of first or second control unit 10; 20. In one preferred specific embodiment, this takes place as a diagnostic fault check (DFC).

As an alternative or in addition to step 540, the time difference between a detection, i.e., the event of the firing of the predefinable cylinder of engine 30 of the first drive unit and the firing of the predefinable cylinder of engine 40 of the second drive unit by first or second control unit 10; 20, may be ascertained in a step 550. This means that a difference between the time of a first occurring event and the time of a second occurring event is determined. Based on this difference, the phase position between the first drive unit and the second drive unit may then be determined.

In one preferred embodiment, the predefinable cylinder under consideration is the same cylinder for engine 30 and engine 40.

Alternatively or additionally, the time difference may be determined from the signals of the position sensors of the first and second drive units, which are generated when rotating propellers 60; 70 of the first and second drive units exceed the predefinable reference position. For this purpose, for example two successive signals are considered.

What is claimed is:

1. A method for monitoring a deviation of a first rotational speed of a first drive unit for an aircraft from a second rotational speed of an at least second drive unit for an aircraft, the method comprising:
   detecting a first event of the first drive unit and detecting a second event of the at least second drive unit;
   comparing the detection of the first event to the detection of the second event; and
   monitoring the deviation of the first rotation speed of the first drive unit from the second rotational speed of the second drive unit as a function of the comparison.

2. The method as recited in claim 1, further comprising:
   incrementing a value of a counter when the first event of the first drive unit is detected; and
   decrementing the value of the counter when the second event of the at least second drive unit is detected.

3. The method as recited in claim 2, wherein the value of the counter is incremented and decremented in whole numbers.

4. The method as recited in claim 1, wherein the first event is a firing of a cylinder of an engine of the first drive unit, and the second event is a firing of a cylinder of an engine of the at least second drive unit.

5. The method as recited in claim 1, wherein the first event is a signal of a position sensor of the first drive unit, and the second event is a signal of a position sensor of the at least second drive unit.

6. The method as recited in claim 2, wherein an adaptation of the deviation of the first rotational speed of the first drive unit from the second rotational speed of the at least second drive unit of the aircraft is carried out as a function of a comparison of the value of the counter to a predefinable threshold value.

7. The method as recited in claim 2, wherein the deviation of the first rotational speed of the first drive unit from the second rotational speed of the at least second drive unit is adapted when the value of the counter exceeds or falls below a predefinable threshold value.

8. The method as recited in claim 2, wherein a control unit of the first drive unit recognizes and stores an error when the value of the counter exceeds or falls below a predefinable threshold value, and a corresponding signal is transmitted from the control unit of the first drive unit to a control unit of the at least second drive unit via a CAN connection, and the signal is received and stored by the second control unit of the at least second drive unit.

9. The method as recited in claim 2, wherein a phase position between a propeller of the first drive unit and a propeller of the at least second drive unit is determined as a function of a time difference that is ascertained between the first event of the first drive unit and a successive, similar second event of the at least second drive unit.

10. The method as recited in claim 9, further comprising:
    detecting, by a position sensor of the propeller of the first drive unit that the propeller of the first drive unit exceeds or falls below a predefinable reference position, and detecting, by a position sensor of the propeller of the second drive unit that the propeller of the second drive unit exceeds or falls below a predefinable reference position;
    transmitting, by the position sensors, a corresponding signal to a respective control unit, as a function of the exceeding or falling below the reference position with the aid of a CAN connection; and
    receiving and storing, by the respective control units, the corresponding signals.

11. The method as recited in claim 1, wherein the first drive unit and the at least second drive unit are each made up of at least one of: an engine, an electronic engine control unit (EECU), an autonomous, full authority digital engine controller (FADEC), a propeller that is connected to the engine, a propeller speed controller that controls a rotational speed of the propeller, and a position sensor of the propeller.

12. The method as recited in claim 1, wherein a control unit of the first drive unit is a master control unit, and a control unit of the at least second drive unit is a slave control unit.

13. A non-transitory electronic memory medium on which is stored a computer program for monitoring a deviation of a first rotational speed of a first drive unit for an aircraft from a second rotational speed of an at least second drive unit for an aircraft, the computer program, when executed by a control unit, causing the control unit to perform:
    detecting a first event of the first drive unit and detecting a second event of the at least second drive unit;
    comparing the detection of the first event to the detection of the second event; and
    monitoring the deviation of the first rotation speed of the first drive unit from the second rotational speed of the second drive unit as a function of the comparison.

14. A control unit for monitoring a deviation of a first rotational speed of a first drive unit for an aircraft from a second rotational speed of an at least second drive unit for an aircraft, the control unit configured to:
    detect a first event of the first drive unit and detect a second event of the at least second drive unit;
    compare the detection of the first event to the detection of the second event; and
    monitor the deviation of the first rotation speed of the first drive unit from the second rotational speed of the second drive unit as a function of the comparison.

* * * * *